INVENTOR
PETER KAFALAS
BY
Richard J. Miller
ATTY.

United States Patent Office 3,500,230
Patented Mar. 10, 1970

3,500,230
LIQUID BLEACHABLE FILTER FOR Q-SPOILING A LASER CAVITY
Peter Kafalas, Sudbury, Mass., assignor, by mesne assignments, to the United States of America as represented by the Secretary of the Navy
Filed Apr. 30, 1965, Ser. No. 452,413
Int. Cl. G02f 1/28, 1/36; H01s 3/00
U.S. Cl. 331—94.5                                1 Claim

ABSTRACT OF THE DISCLOSURE

This invention related to a Q-spoiled laser cavity utilizing a solvent having dissolved therein specific chemical compounds which are bleachable when subjected to a given level of electromagnetic wave radiation and after that are virtually transparent.

---

This invention relates to an improved laser device and more specifically to a Q-switching device having improved operating characteristics.

The general operation of devices which produce stimulated emission radiation are well known and need not be gone into for the purposes of this invention. Normally, there are two types, either the maser type which is at the microwave frequencies or the laser type which is at or near light frequencies of the electromagnetic wave radiation spectrum. These devices include, among other things, a material which when properly stimulated can absorb electromagnetic wave radiations and emit them at a different frequency in a coherent, amplified wave as a collimated beam. Generally, the laser cavity is included between a pair of reflective surfaces and has a device for the source of pumping energy such as a flash lamp.

A problem encountered in such devices is one of random firing or triggering of the stimulated emission before the material has time to absorb all the energy that it can store. Various techniques have been tried to Q-spoil the cavity, where the term Q is the figure of merit of a resonant circuit. Q-spoiling or Q-switching is understood to mean that there is a way of changing the Q of the resonant circuit. This has been tried in many ways including rotating prisms to control the mirror angles, varying the reflectivity of the mirrors and solid composition of dyes mounted on an optically transparent substrate. All these techniques meet with varying degrees of success but none provide the degree of control provided by this invention.

It is an object of this invention to provide an improved device for cont rolling the emission of a laser device.

It is a further object of this invention to provide an improved Q-switching device for controlling the emission of radiation from a laser rod.

It is still a further object of this invention to provide an improved passive Q-switching device having the ability to control the emission from a laser cavity.

Yet another object of this invention is to provide a Q-switching device including a liquid having dispersed therein a material which, when subjected to a predetermined amount of radiation rapidly, increases its transmissivity.

It is a further object of this invention to provide a Q-switching device using methanol as a solvent solution and cryptocyanine as an absorbent dye.

Still another object of this invention is to provide a passive Q-switching device in a laser cavity which has a transparent solvent at the laser frequency and a dye added which absorbs radiation at the laser frequency until it is saturated and then the total solution becomes transparent to light at the laser frequency.

Figure 1:
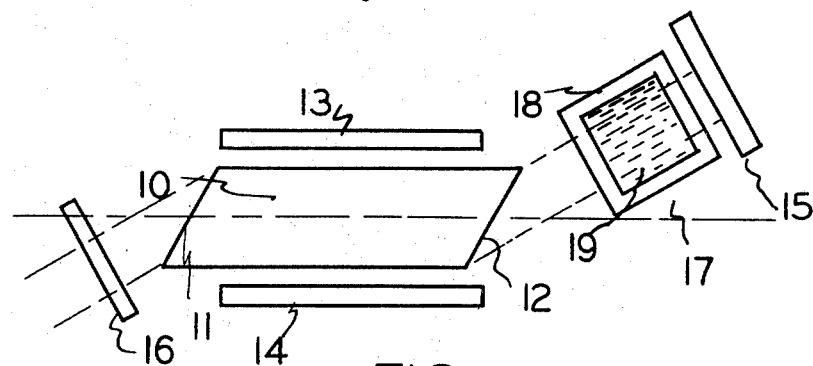
Figure 2:
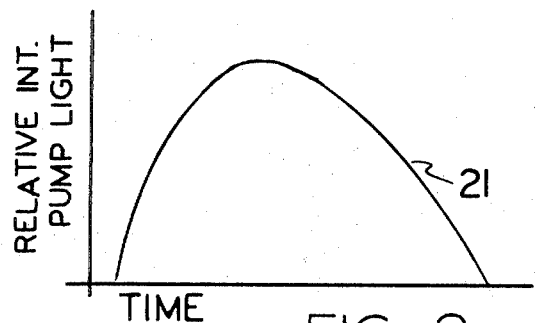
Figure 5:
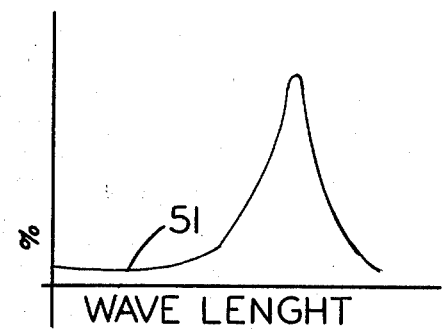
Figure 3:
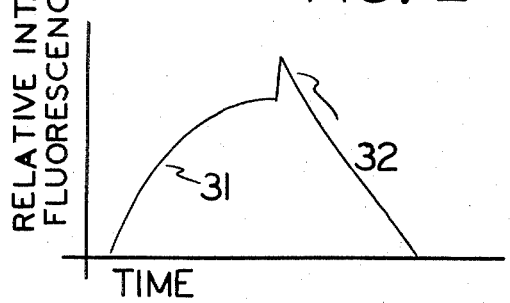
Figure 4:
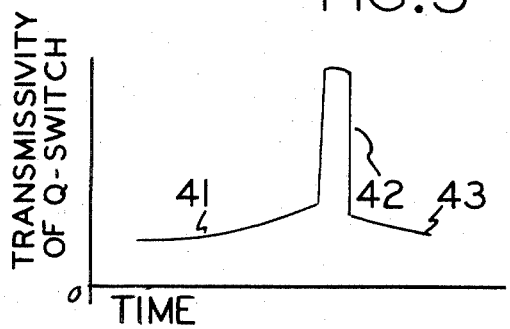

Other objects, advantages and novel features of the invention will become apparent from the following detailed description of the invention when considered in conjunction with the accompanying drawings wherein:

FIGURE 1 shows one embodiment of the invention incorporating a Q-switching device;
FIGURE 2 is a curve showing pump intensity with respect to time;
FIGURE 3 is a curve showing the relative intensity of fluorescence of the laser rod in FIGURE 1 with respect to time;
FIGURE 4 is a curve showing the transmissivity of the Q-switching device in FIGURE 1; and
FIGURE 5 is a curve showing the absorption spectrum of cryptocyanine in methanol.

The device shown in FIGURE 1 includes a rod 10, which in this instance is ruby, having Brewster ends 11, 12, and a pair of pump flash lamps 13 and 14. In addition a fully reflective mirror 15 and a partial reflective mirror 16 are provided and these define the outer limits of a resonant optical cavity. To Q-spoil the cavity there is provided a Q-switch 17 which has an outer housing 18 and a liquid center 19 having specific properties as hereinafter more fully described. Standard operation of a laser cavity include actuating the flash lamps 13, 14 and intensely illuminating the laser rod 10 which absorbs energy in certain well known and well defined frequency bands.

FIGURE 2 shows the relative intensity of the pump light with respect to time. The vertical axis in this case being relative intensity, calibrated from zero to one hundred percent, and the horizontal axis being timed from some reference zero point. Idealized curve 21 represents the total time spread of frequencies illuminating the rod.

With normal operation of a laser rod, FIGURE 3 shows the relatively intensity of rod fluorescence with respect to time. The vertical axis in this case is relative intensity from zero to one hundred percent, and the horizontal time axis from zero corresponding to the time axis in FIGURE 2. A curve generally designated as 31 is shown which represents the fluorescence or emission from the laser material 10 which in effect corresponds to the photon emission from the laser material. It is to be noted that the spike 32 in FIGURE 3 represents that point at which lasing takes place and a very narrow band spread in the neighborhood of 0.1 angstrom wide at a carrier wavelength of approximately 6943 angstroms is emitted as a coherent beam.

In a laser cavity not having a Q-switching device the emission from the laser rod is a random emission, in the sense that it is not controlled by an external source, but comes when the losses within the cavity are overcome at a given frequency: when photons emitted at one point in the laser rod and traveling down the rod are amplified so that they have a net gain more than 1.0. At that time the rod will lase and the energy stored in the excited state is "dumped."

The Q-switch as disclosed by this invention improves the operation of such a laser cavity by allowing the absorption of more pump energy into the laser material and rapidly controlling or switching the Q of the cavity from a low to a high value by switching its transmissivity in the following manner.

Housing 18 of Q-switch 17 is constructed of any suitable material which is transparent to light energy at the laser frequency of rod 10. Its dimensions are such that it is larger than the diameter of rod 10. Housing 18 is hollow and has confined therein a liquid 19 containing a specific doping concentration of certain materials.

In one successful embodiment of the device the housing 18 had a dimension of approximately one centimeter on a side and contained therefore approximately 1 cubic centimeter of material. Hence, the path length through the Q-switch was one centimeter. The solvent may be either water or acetone and the dopant or dye for control material might be Victoria Blue B dye or chlorophyll. When the Victoria Blue B and acetone were used or chlorophyll in water, Q-switching is observed.

Another combinatin of carrier and dopant, which provides the desired Q-switching effects is Methylene Blue in water. With this solution the laser pulse proved to be extremely sharp and was in the range of 20 to 25 nanosecond wide at half-maximum. An additional material may be added to the solution such as L-ascorbic acid, it is to be noted that with materials as provided a power peak of at least fifteen times greater than normal in lasing with the same pump energy has been observed. Such successful increases in peak power are extremely desirable.

Once the laser beam has passed through the passive Q-switch, as shown, it returns to its lower transmissivity, as shown in FIGURE 4 by the curve 41. This graph has transmissivity plotted along the vertical axis of the Q-switch and the horizontal axis is time started at the same zero and extending to the right, as those in FIGURES 2 and 3. In this instance the transmissivity of the Q-switch is shown starting at some point above zero since the solution is relatively somewhat transparent to observation and there is a slight increase of transmissivity to some predetermined point at which time the spiking appears on curve 41 as 42. This corresponds to the bleaching of the liquid to a point where the transmissivity is greatly increased to some point approaching ninety to one hundred percent. After the laser beam has passed the Q-switch device curve 41 returns to the lower point of transmissivity as shown by portion 43. Thus, it is ready for the next pulsing by laser 10.

An additional efficient liquid Q-switch which has been tested and proven very effective is a solution of cryptocyanine (1,1'-diethyl-4,4'-carbocyanine iodide) in methanol. Crytocyanine has a structure as follows:

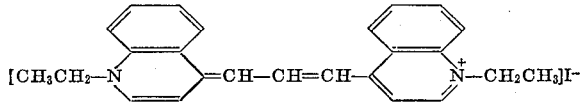

The absorption cross-section of cryptocyanine for ruby laser radiation (6943 A.) is $8.1 \times 10^{-16}$ cm.$^2$ per molecule. The solution absorbs radiation in a narrow band (approximately 370 angstroms FWHM), peaked at 7040 angstroms.

FIGURE 5 shows the absorption spectrum of cryptocyanine in methanol as curve 51. The peak can be shifted slightly by using a different solvent. The concentration or the path length of the solution may be varied to produce any desired absorption.

One embodiment of the invention utilized the liquid Q-switch using a 0.63 centimeter (¼") diameter, ninety degree ruby rod, 5 centimeters long. One refletcor was the T.I.R. (total internal reflection) prism and the other was a dielectric mirror of fifty-five percent reflection. The laser rod was pumped by a helical flash lamp (G.E.FT. 524) in a cylindrical enclosure. The cell containing the solution was placed between the ruby rod and the 55 percent mirror. The output pulse was attenuated and then measured with an I.T. and T. photodiode and a Tektronic model 519 oscilloscope. The laser excitation, and hence the peak power depend on the concentration of the solution in the cell. In a solution of $1.8 \times 10^{-6}$ M cryptocyanine solution in 1-cm. cell, the light-flux absorption of the cell is 58 percent at the laser wave length. A symmetric pulse of 9 nanosecond width (FWHM) and 5 mw. peak power was produced. It is to be noted that the same cell was used several times without changing the solution and produced pulses all of the same size and shape. There was no noticable absorption spectrum change in the solution.

In a material with a high cross-section, such as cryptocyanine, the initial laser radiation would have a sufficiently high flux to partially saturate the absorber. In a 1-mw. beam having a cross-sectional area of 0.2 cm.$^2$, there are $1.7 \times 10^{16}$ photons nanosecond$^{-1}$ cm.$^{-2}$; thus, there are 16 photons per nanosecond for each molecule of cryptocyanine in the beam if the absorber is a 1 cm. solution of concentraiton $1.8 \times 10^{-6}$ M. Therefore, it appears that saturation is reasonable; at the excited single state of the molecule it could have a lifetime sufficiently long to make possible the saturation of the absorber by population equalization during the generation of the pulse. The absorber would approach transparency with a laser radiation during the rise time of the giant pulse.

Obviously many modifications and variations of the present invention are possible in the light of the above teachings. It is therefore to be understood that within the scope of the appended claim the invention may be practiced otherwise than as specifically described.

I claim:
1. An improved light switch for controlling a specific band of radiation; comprising:
 (a) a hollow transparent housing; and
 (b) a media in said housing including a solvent, a dopant, and an additive wherein said solvent is one of the group consisting of water and acetone; the dopant is one of the group consisting of Victory Blue B dye, chlorophyll, and methylene Blue; and the additive is L-ascorbic acid.

References Cited

UNITED STATES PATENTS 3,370,902   2/1968   Allinikov.
3,418,599   12/1968   Soffer _____ 331—94.5

OTHER REFERENCES

Sorokin et al., Ruby Laser Q-Switching Elements Using Phthalocyanine Molecules in Solution. IBM J. of Res. & Dev., vol. 8, No. 2, (April 1964) pp. 182–4.

Kafalas et al., Photosensitive Liquid Used as a Nondestructive Passive Q-Switch in a Ruby Laser, J. Appl. Phys., vol. 35, No. 8 (August 1964) pp. 2349–50.

Soffer, Giant Pulse Laser Operation by a Passive, Reversibly Bleachable Absorber. J. Appl. Phys., vol. 35, No. 8 (August 1964) p. 2551.

JEWELL H. PEDERSEN, Primary Examiner
W. L. SIKES, Assistant Examiner

U.S. Cl. X.R.
350—160